Sept. 8, 1942.  F. D. BRADDON  2,295,254
AIR BORNE GYRO-COMPASS
Filed June 21, 1939  3 Sheets-Sheet 1

INVENTOR
FREDERICK D. BRADDON
BY
Herbert H. Thompson
HIS ATTORNEY

Sept. 8, 1942.   F. D. BRADDON   2,295,254
AIR BORNE GYRO-COMPASS
Filed June 21, 1939   3 Sheets-Sheet 2

INVENTOR
FREDERICK D. BRADDON
BY
HIS ATTORNEY

Sept. 8, 1942.   F. D. BRADDON   2,295,254
AIR BORNE GYRO-COMPASS
Filed June 21, 1939    3 Sheets-Sheet 3
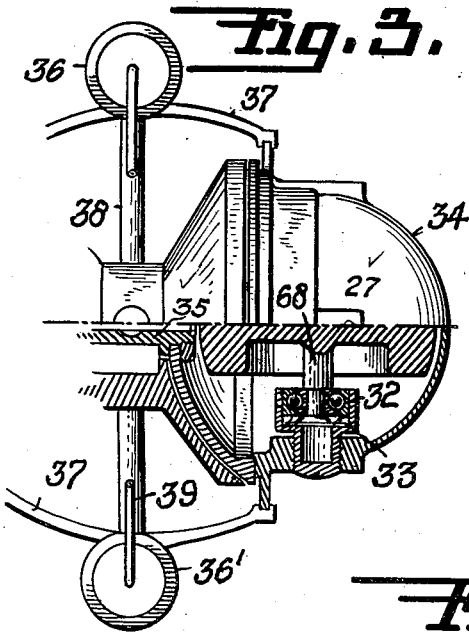
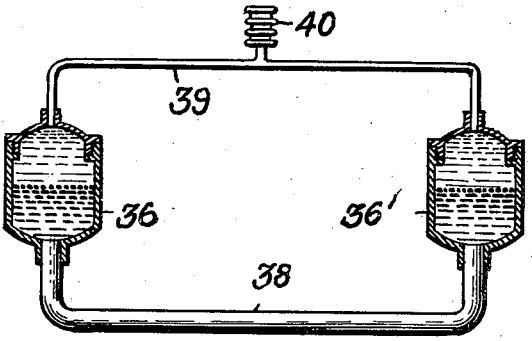
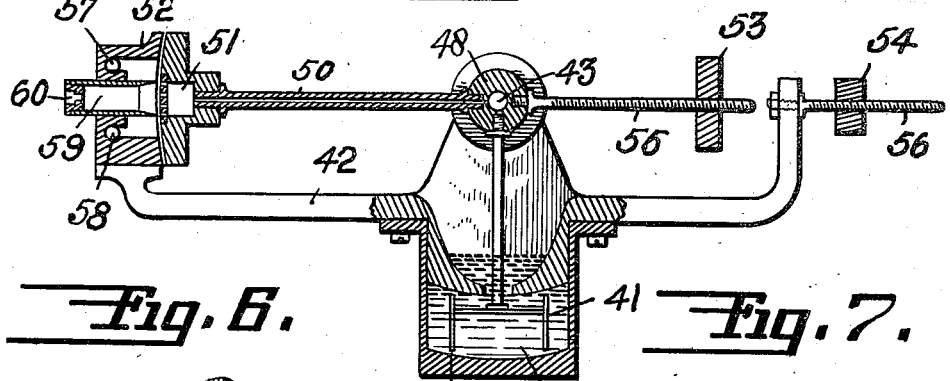
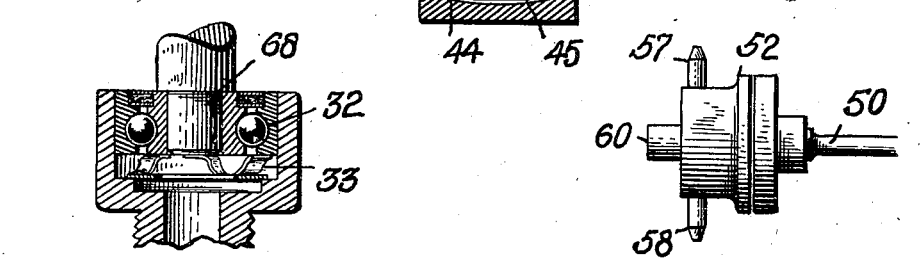
INVENTOR
FREDERICK D. BRADDON
BY
Herbert H. Thompson
HIS ATTORNEY.

Patented Sept. 8, 1942

2,295,254

UNITED STATES PATENT OFFICE 2,295,254

AIR BORNE GYROCOMPASS

Frederick D. Braddon, Babylon, N. Y., assignor to Sperry Gyroscope Company, Inc., Brooklyn, N. Y., a corporation of New York Application June 21, 1939, Serial No. 280,243

11 Claims. (Cl. 33—226)

This invention relates to air borne gyroscopic instruments and especially to gyroscopic compasses. Some of the objects of the invention are to simplify the construction of such compasses so as to reduce the overall dimensions, and to lighten and simplify the structure.

A further object of the invention is to reduce the separation of the bearings to a minimum so as to give greater rigidity and less variations due to temperature changes and the like.

A still further object is to improve the suspension and follow-up systems of the compass for the purpose of reducing the so-called gimbal error.

Other objects of the invention are to improve the damping system and to simplify the balancing of the compass, whereby the necessity for compensating weights with their added weight is largely eliminated.

Referring to the drawings illustrating one form my invention may assume,

Fig. 3 is a plan view, partly in section, of the sensitive element of the invention, only one of the gyroscopes being shown, however.

Fig. 4 is a vertical sectional detail of the mercury ballistic or gravitational factor.

Fig. 5 is a vertical section of my preferred damping means.

Fig. 6 is a sectional detail of the spring thrust collar used on the rotor shaft of each gyroscope.

Fig. 7 is a fragmentary plan view of one end of the damper.

Figure 1:
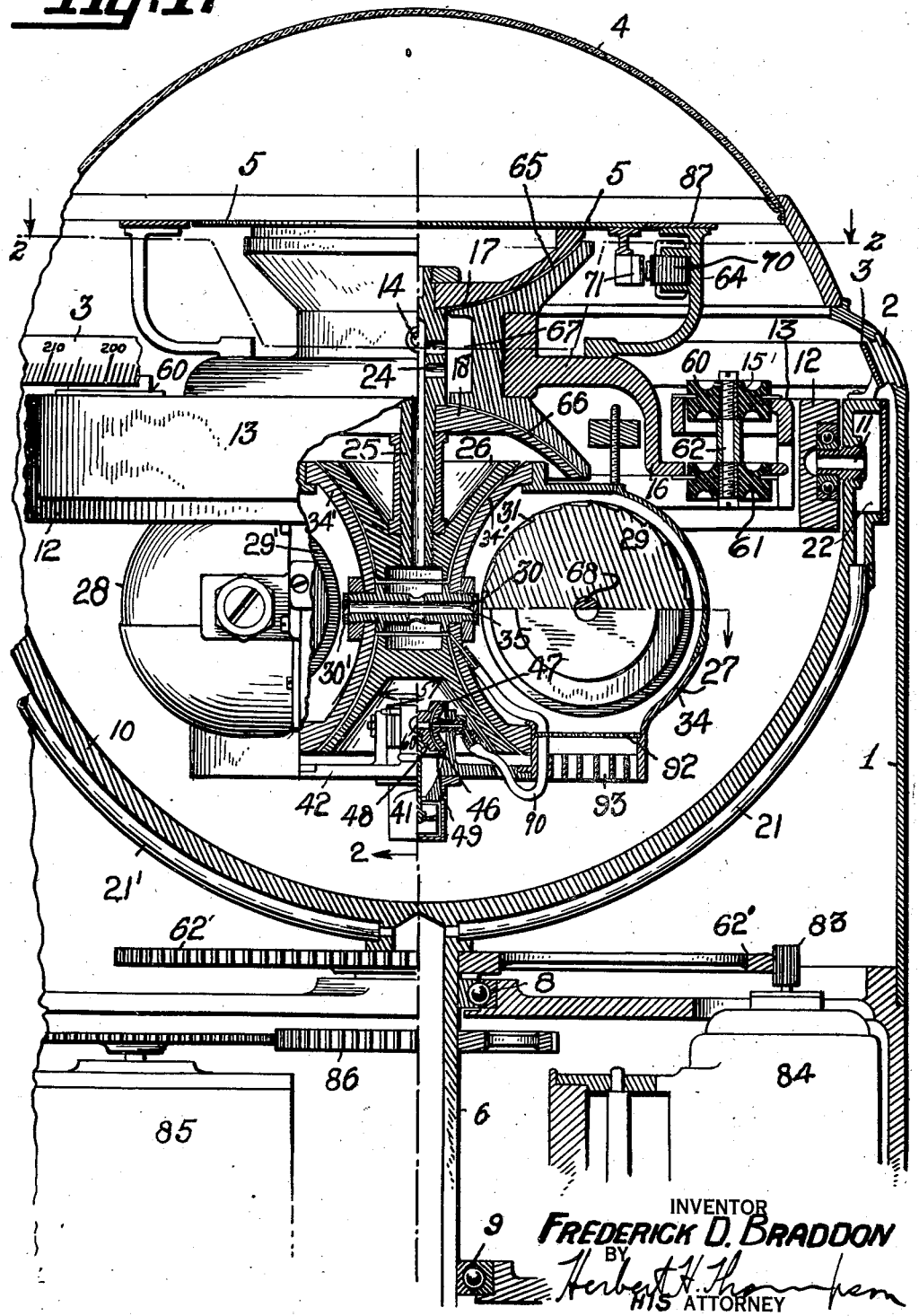
Fig. 1 is a south elevation partly in section of my air borne compass.

The gyro-compass is shown as suspended within an outer frame 1 provided with an annular window 2 through which compass card 3 is visible. A glass dome 4 may also be provided for the compass for viewing a flat auxiliary compass card 5 from the top thereof. Instead of supporting the compass element within gimbals pivoted in the fixed frame as is usually done, I prefer to mount the gimbal system for turning about a vertical axis and to maintain it fixed in azimuth from the sensitive element of the compass. To this end, I have shown the entire compass system as supported on a vertical stem 6 mounted for rotation about a vertical axis in upper and lower bearings 8 and 9 in the frame 1. Said stem carries a bracket or spider 10 which pivotally supports on trunnions 11, a gimbal ring 12. Said gimbal ring, in turn, supports the ring 13 on horizontal trunnions 14 normal to the trunnions 11 so that the compass is universally mounted within the spider 10.

I prefer to interpose, however, between the sensitive element and the inner ring 13, shock absorbing means 15 of which there may be four, symmetric positioned and yieldingly supporting the spider 16 from the ring 13. Each mounting is composed of a pair of spaced rubber discs 60, 61, the lower of which is suspended from the upper by stem 62 and the discs having metal annular plates embedded in their periphery by which they are secured to ring 13 and spider 16, respectively.

Figure 2:
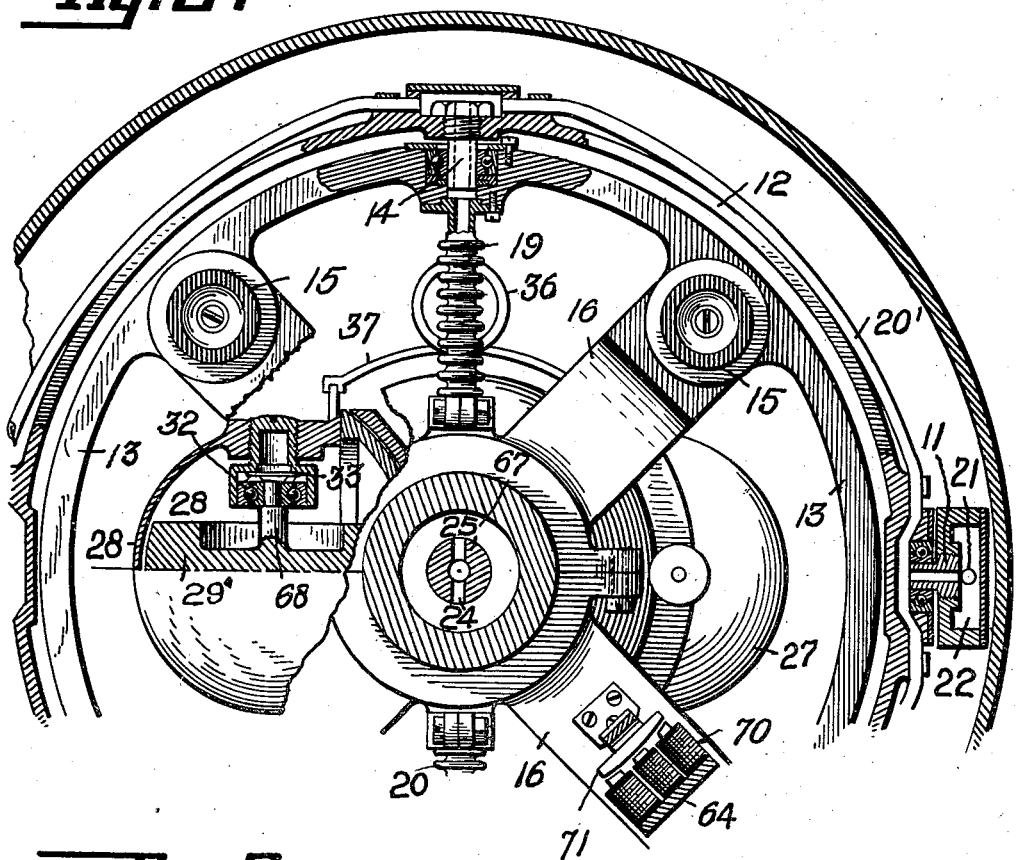
Fig. 2 is a plan view of the same, also partly in section and partly broken away, the section being taken on line 2—2 of Fig. 1.
Figure 8:
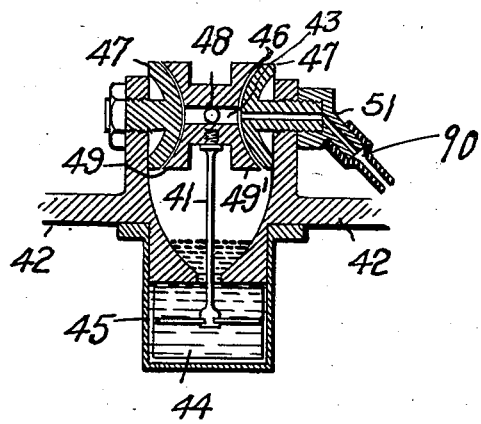
Fig. 8 is a sectional detail of the mount for the damping pendulum.

Secured to the spider 16 is one element of each of a pair of oppositely facing vertical air bearings or cups 65 and 66 for supporting the entire sensitive element for freedom about the vertical axis. As shown, the two cups are centrally apertured and are joined by a short annular section 67 forming a framework rigidly supported by spider 16. Upper and lower buttons 17 and 18 loosely fit in the cups so that when air is forced between the cups and the buttons, the entire sensitive element is floated about its vertical axis. Air is introduced into these bearings through flexible pipes 19 and 20 (Fig. 2), which lead air into the hollow center of the part 67 from whence it flows outwardly between each cup and button.

Air is introduced into said pipes through hollow trunnions 14 extending from the gimbal ring 12 into ring 13. Said gimbal ring is likewise provided with a pipe 20' to furnish a passage for the air introduced through the hollow trunnions 11 from the bracket 10. Originally, the air passes upwardly through the hollow stem 6 and through pipe 21 and into hollow chamber 22, adjacent the hollow trunnion 11. It is to be understood that the opposite trunnion 11 which is not shown in Fig. 1 may be constructed in the same manner, air being led to pipe 21' on bracket 10.

A portion of the air being led to the chamber in member 67 also passes into a bore 24 in the vertical stem 25 extending through aligned apertures in the buttons and cups and to which stem the spaced buttons 17, 18, are secured. Suspended on said stem is the frame 26 which supports the gyroscopic or sensitive element for freedom about a horizontal east-west (E-W) axis. Preferably, I employ two gyroscopes 21 and 28 for my sensitive element. The rotors 29, 29' of both gyroscopes are preferably spun in the same direction as from air nozzles 30 and 30' from which the jets impinge buckets 31 on the peripheries of the rotors. The spent air escapes downwardly in a neutral direction through baffle plates 92 and 93 to reduce eddy currents.

The gyro rotors are shown as having their shafts 68 mounted on anti-friction bearings 32 for spinning about horizontal normally north-south (N-S) axes. Preferably, one only of the bearings for each rotor is axially spring loaded as by means of the dished spring disc 33 (Fig. 6) to minimize changes of balance and binding due to expansion and contraction of the rotor shaft. Preferably, the single spring loaded bearing on each rotor is placed at opposite ends of the two gyroscopes being shown on the north end of rotor 29' and the south end of rotor 29" to further reduce changes in the balance.

The casing or support 34 for each rotor is formed at its inner side with a hollow spherical portion 34' so as to form one part of an air bearing whose axis is horizontal. As shown, the rotor casing is made button shaped or convex while the concave portion of the bearing is duplicated or oppositely faced for the two gyroscopes and the two buttons are anchored at their centers by a short hollow stem 35. Said stem 35 is shown as leading the air to the nozzles 30, 30' while the air also flows upwardly, downwardly, and outwardly between the complementary air bearing surfaces thus supporting the gyro unit for oscillation about an east-west axis.

For imparting meridian seeking properties to the compass, I have shown a pair of liquid containers 36, 36' secured to brackets 37 fastened to the rotor bearing casings so as to tilt with the gyroscopes. As shown in Figs. 3 and 4, said containers are connected at their bottoms through tube 38 in the usual manner, and also may be connected, if desired, at their tops through a smaller bore tube 39. If this is done, a lighter liquid such as alcohol is placed on top of the mercury in each container so as to fill the tube 39 and an expansible chamber 40. By using a lighter liquid in a small bore tube, the flow of mercury may be retarded to any desired extent without breaking up the mercury column.

For damping the compass I have shown a small pendulum 41 pivoted on a framework 42 secured between the bottoms of the two gyro casings. Said pendulum is shown as pivoted on east-west axis 43 and is damped, as shown in Figs. 5 to 8, by having the lower end or bob thereof made in the form of paddles 44 immersed in a chamber 45 containing oil. The pendulum is supported for oscillation about axis 43 on air bearing 46 comprising a pair of oppositely faced buttons 47 on the frame 42, which support cross piece 48 provided with complementary concave surfaces 49, 49' for oscillation about a horizontal axis. Secured to said member 48 is a comparatively long hollow arm 50 which communicates with the hollow member 48 and transmits the air to the outer end of said arm.

Said arm is shown as having an apertured member 51 at its outer end. The apertures discharge air into a hollow member 52 fixed to bracket 42. Adjustable counter-balancing masses 53 and 54 are shown on extensions 55 and 56, respectively, from member 48 and bracket 42, respectively, for counter-balancing the mass of the arm 50 and part 52. The chambered member 52 is provided with two oppositely directed nozzles 57 and 58 positioned above and below a center line of said member. In the middle of said member is inserted a cylindrical baffle or dividing member 59, the outer edge of which is normally substantially in line with the outer apertures at the top and bottom of chamber 51. Therefore, when the pendulum 41 is vertical, substantially all the air therefrom enters the tube 59 and emerges into the atmosphere in a neutral direction, i. e., in a north-south direction from opening 60 in the end thereof which lies in the vertical center plane of the compass. If, however, relative tilt occurs between pendulum and the gyroscopes to which the frame 42 is secured some of the air will be deflected into the upper or lower portion of the chamber, causing a flow of air through one or the other of nozzles 57, 58 to exert torque in one direction or the other about the vertical axis of the compass to reduce the tilt and damp the same. Air is shown as led into bearings 46—47 and the damping jets through a small pipe 90 tapped into one of the main air bearings 26—34.

It should be noted that the compass as a whole is made symmetrical about its vertical axis of orientation, i. e., about the axis of stem 25 which normally coincides with the axis of stem 6. The horizontal trunnion 35, which supports both gyros 27 and 28 for oscillation about a common horizontal axis of the trunnion and ties the same rigidly together, is shown as intersecting and being bisected by the aforesaid vertical axis. In addition, the horizontal axis 43 of oscillation of the damping pendulum 41 also intersects and is bisected by the aforesaid vertical axis of stem 25, so that the compass is entirely symmetrical about said axis.

For causing the outer frame 10 to follow the compass, I have shown the stem 6 as provided with an azimuth gear 62' driven from a pinion 83 from an azimuth motor 84. Said motor is shown as controlled from any suitable pick-up device positioned between the sensitive element and its main support 17. Said pick-up device may consist of an electrical inductive device common in the prior art, comprising a three-legged transformer 70, the wound portion being placed on an extension 64 from the spider 16 and the movable core 71 being placed underneath the card 5. A self-synchronous transmitter 85 is shown as driven from a gear 86 on the stem 6. Since my compass is air borne it will continue to function even if the follow-up system fails or is not in use. In such a case, the compass may be read by setting card 3 to zero and reading the card 5 on the lubber ring 87 secured on top of the bracket 64.

As many changes could be made in the above construtcion and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an air borne gyro-compass, a pair of upwardly and downwardly facing cups positioned adjacent each other and having vertically aligned central apertures, a vertical stem extending through said apertures, inwardly facing buttons secured to said stem, each fitting its respective cup, means for causing air flow between said cups and buttons giving freedom about a vertical axis, a pair of adjacent E-W facing cups secured to said stem and having E-W apertures, a second stem extending therethrough, inwardly facing buttons secured to said second stem, each fitting a respective one of said pair of E-W cups, means for causing air flow between said E-W cups and buttons giving freedom about an E-W axis, and a rotor supported by each of the last named buttons for spinning about spaced N-S axes.

2. An air borne gyro-compass as claimed in claim 1 characterized by having both said stems hollow to provide interconnected passageways for leading air to both pairs of cups and buttons.

3. A sensitive element for gyro-compasses, comprising a pair of rotors spaced E-W, a rotor bearing casing for each, having spherical convex adjacent portions, a short hollow E-W stem securing said portions together, a supporting member between said portions having oppositely facing cups cooperating with said portions to form air bearings, means for mounting said member for turning about a vertical axis, and means for forcing compressed air through said stem to float the gyro casings on air films for pivotal movement about a normally horizontal axis.

4. A sensitive element for gyro-compasses as claimed in claim 3 wherein said hollow stem also leads air into both casings for spinning the rotors.

5. In a gyro-compass, a follow-up support mounted for turning about a vertical axis, a motor for orienting said support, a gimbal ring pivoted therein, a second ring pivoted within said gimbal ring whereby said second ring is universally supported, a compass spider, shock mountings supporting said spider from said second ring, a sensitive element mounted for turning about a vertical axis in said spider and a follow-up controller between said element and spider for controlling said motor.

6. A pendulous controlling device for gyroscopic compasses having a vertical axis of orientation and horizontal axes of oscillation and spin normal to one another, comprising a pendulum normally lying in said vertical axis, air bearings for supporting the same for oscillation about an axis under and parallel to said other oscillation axis, a hollow arm secured to said pendulum and extending laterally therefrom normally parallel to said spin axis, and having ports in the end thereof from which air is discharged in a neutral direction, a divided chamber mounted on the gyroscope adjacent said ports and intercepting and differentially dividing the air stream therefrom, said chamber having at least three ports, two of which direct the air laterally in opposite directions in accordance with relative tilt of the gyroscope and pendulum, and the third of which normally directs the air in a neutral direction.

7. A damping device for gyroscopic compasses, comprising a liquid damped pendulum having the bob thereof immersed in liquid, air flow bearings pivotally suspending said pendulum from the compass for oscillation about an E-W axis, a hollow arm extending from said pendulum in a N-S direction, having at its end discharge ports, shutter means on the compass for dividing the air issuing from said ports and directing portions thereof laterally and oppositely and other portions thereof in a neutral direction, the proportional amount of air issuing in each direction laterally being varied in accordance with the respective direction and amount of relative tilt of the compass and pendulum.

8. In a twin gyro-compass, a pair of gyro rotors placed side by side with spaced parallel spin axes, a rotor bearing casing for each, a common horizontal trunnion tying said casings together and mounting said casings for oscillation about a common horizontal axis, and a pivotal support for said trunnion mounted for turning about a vertical axis.

9. In a twin gyro-compass, a pair of gyro rotors fixed side by side with spaced parallel spin axes, a rotor bearing casing for each, a common horizontal trunnion tying said casings together and mounting the same for oscillation about a common horizontal axis, a support for pivotally supporting said trunnion, and means for mounting said support for rotation about a vertical axis which bisects said trunnion.

10. In a twin gyro-compass, a pair of gyro rotors fixed side by side with spaced parallel spin axes, a rotor bearing casing for each, a common horizontal trunnion tying said casings together and mounting the same for oscillation about a common horizontal axis, a support for pivotally supporting said trunnion, means for mounting said support for rotation about a vertical axis which bisects said trunnion, and a pendulous damper pivotally mounted on said support on a horizontal axis which intersects said vertical axis.

11. In a twin gyro-compass, a pair of gyro rotors placed side by side with spaced parallel spin axes, a rotor bearing casing for each, a spring take-up bearing between the shaft of one rotor and its casing at one end thereof, a similar spring take-up bearing between the shaft of the other rotor and the opposite end of its casing, a common horizontal trunnion tying said casings together and mounting said casings for oscillation about a common horizontal axis, and a pivotal support for said trunnion mounted for turning about a vertical axis.

FREDERICK D. BRADDON.